Oct. 30, 1951     J. MARTIN     2,573,472
AUTOMATIC AND PROGRESSIVE CHANGE-SPEED GEAR
Filed Jan. 6, 1948     3 Sheets-Sheet 1

Inventor
Jean Martin

Attorneys

Oct. 30, 1951 J. MARTIN 2,573,472
AUTOMATIC AND PROGRESSIVE CHANGE-SPEED GEAR
Filed Jan. 6, 1948 3 Sheets-Sheet 2
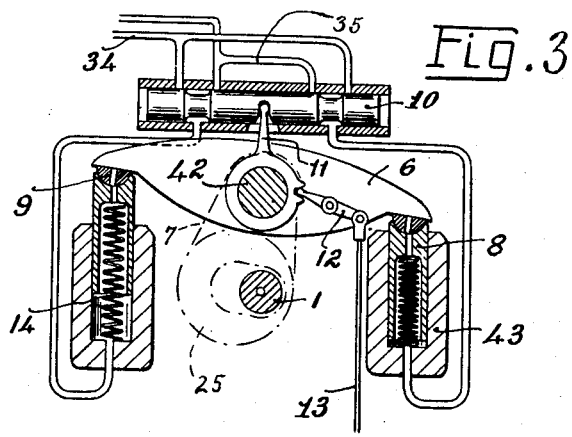
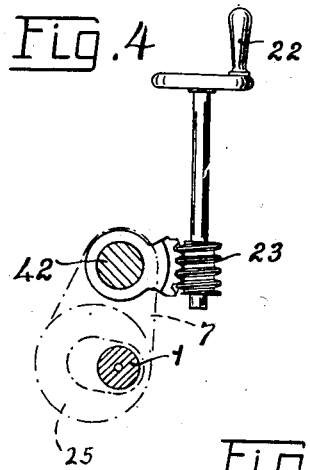
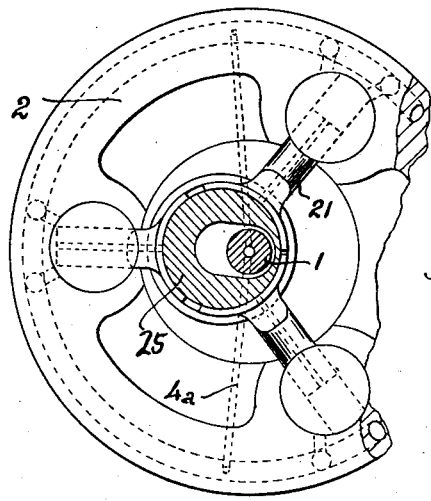
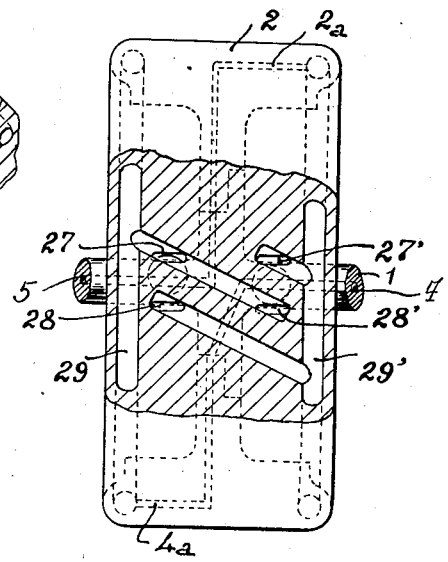
Inventor
Jean Martin
Attorneys

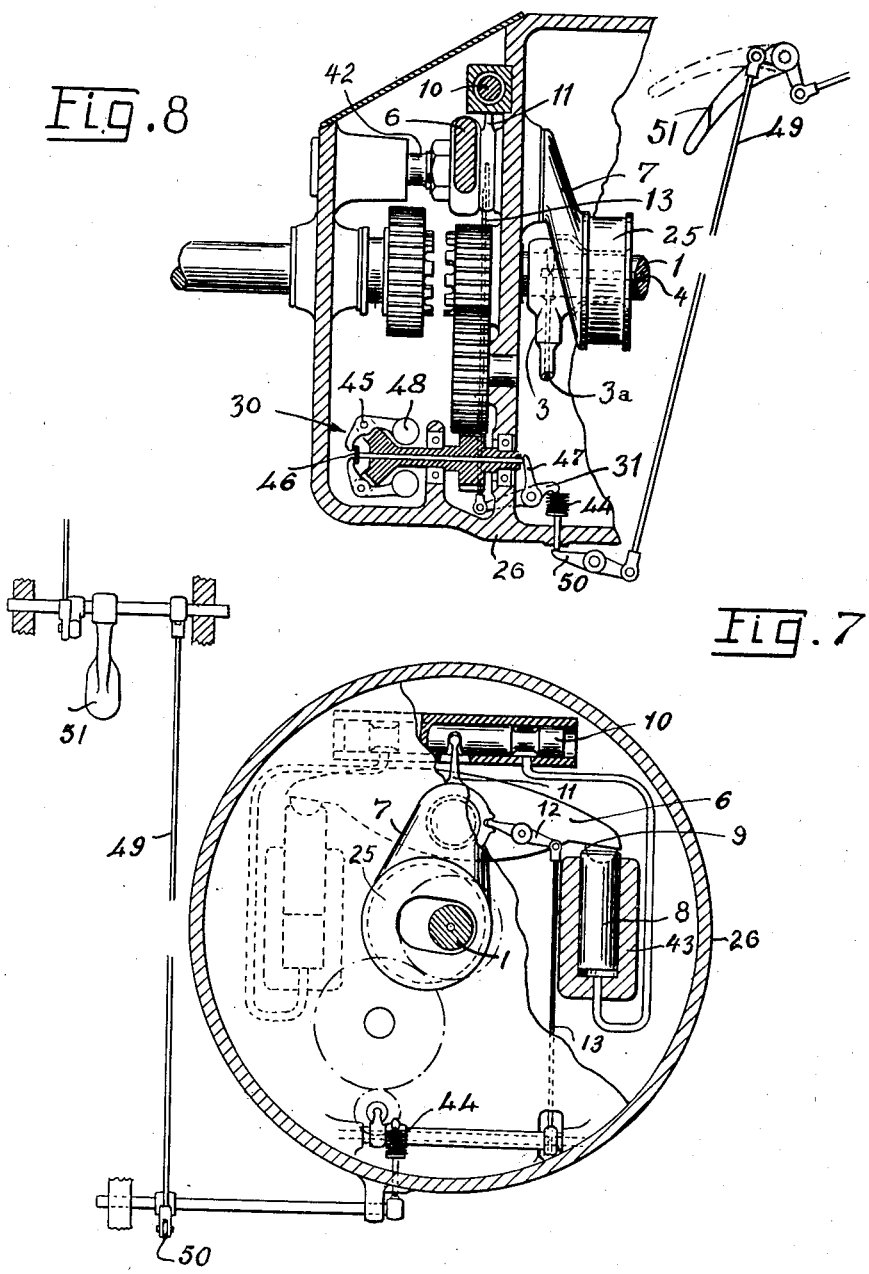

Patented Oct. 30, 1951

2,573,472

UNITED STATES PATENT OFFICE 2,573,472

AUTOMATIC AND PROGRESSIVE CHANGE-SPEED GEAR

Jean Martin, Paris, France

Application January 6, 1948, Serial No. 753
In France January 8, 1947

8 Claims. (Cl. 74—790)

A progressive variable speed transmission should be capable, without any extraneous aid, of a wide range of speeds with an increase of the torque when the speed decreases and this should be within the range of the power the equipment is called upon to yield. Various hydraulic arrangements already known have a poor efficiency as a consequence of the excessive velocity of the working fluid:

It is an object of the invention to provide a variable speed transmission including between a driving and a driven shaft, a planetary gear system mounted on a cage assembly, the progressive functioning of said transmission, automatic or otherwise, depending on the change of speed of said cage assembly, which is effected through a hydraulic unit including a pump and a motor adapted to form a closed hydraulic circuit, the body of said unit being fixed rigidly to the driven shaft while the control parts of the pump are linked to the cage assembly and the driven parts of the motor are associated with a part adjustably connected to the casing for changing its position. Thus, the fluid is supplied by the pump to the motor in variable quantities in consequence of the said adjustable connection whereby the pump necessarily adjust the speed of the control parts linked to the cage assembly for delivering to the motor, during equal times, equal quantities of fluid.

Another object of the invention is to provide a variable speed transmission in which, when the control parts of the motor are at a standstill, the control parts of the pump will be also stationary, whereby the same speeds are obtained for the cage assembly and the driving and the driven shaft without any movement of the fluid in the hydraulic circuit.

A further object of the invention is to provide a variable speed transmission adapted to allow an appreciable reduction in the movement of the fluid for the most unfavorable speed, that is to say the lowest speed of the driven shaft, while with a usual hydraulic system, the movement of the fluid would be three or four times faster.

Further objects and advantages of the invention will become apparent as the following description proceeds, and the features of novelty which characterize the invention will be pointed out with particularity in the accompanying claims and forming a part of this specification.

In the accompanying drawings:

Fig. 3 is a cross section along the line III—III of Fig. 1;

Fig. 4 is an assembly sketch for the case where a hand control is used;

Fig. 5 is a cross sectional view of the hydraulic body through line V—V of Fig. 1;

Fig. 6 is a cross section showing the interconnection between the cooperating pump cylinders and motor cylinders through the hydraulic body;

Fig. 7 is a detail view corresponding to Fig. 3;

Fig. 8 is a side partly sectional view of the variable speed transmission from the side opposed to Fig. 1 and incorporating a centrifugal regulator.

Figure 1:
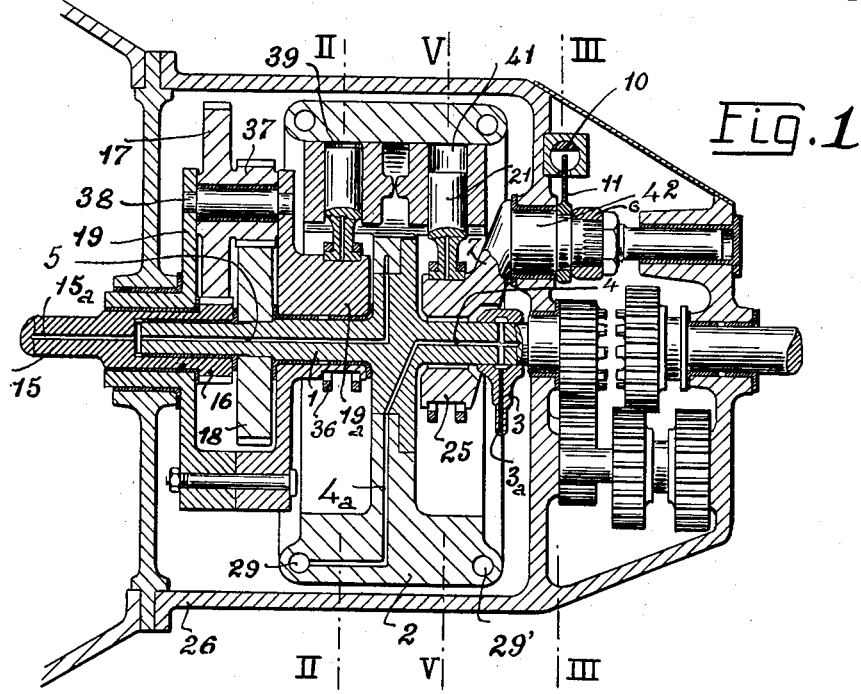
Fig. 1 is a longitudinal section of a variable speed transmission.
Figure 2:
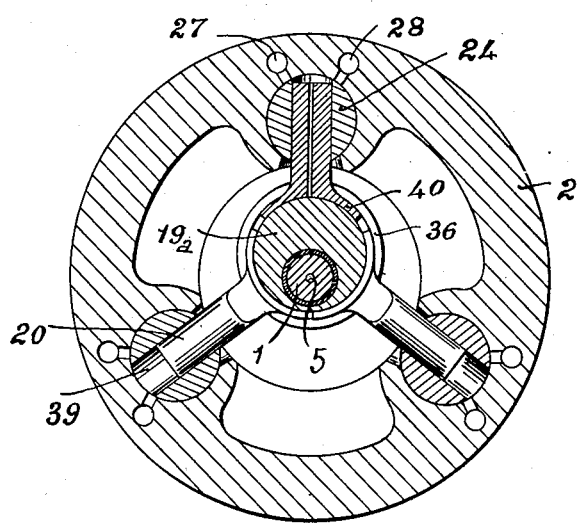
Fig. 2 is a cross section through the line II—II of Fig. 1.

Referring primarily to Fig. 1, it will be seen that the numeral 15 indicates the driving shaft and 1 the driven shaft, the shaft 15 being coupled to a prime mover such as an internal combustion motor not shown, while the shaft 1 is coupled to a propeller shaft or other element to be driven. There may be interposed between the shafts 15 and 1 a mechanical drive in the form of a planetary gear assembly, including in the illustrated example, a gear 16 fixed to the shaft 15 and engaging a gear 17, a gear 37 fixed with respect to the gear 17, of different diameter, engaging the gear 18 rigid with the driven shaft 1. These gears 17 and 37 are supported by shaft 38 mounted on a cage assembly 19. Fixed with respect to said cage assembly 19, or, in fact integral therewith, is an eccentric 19a. This member encircles the driven shaft 1. A cylindrical and rotary body 2 is fixed with respect to the driven shaft 1 and will rotate in the same direction through the same number of revolutions. In the body 2 is provided a plurality of pump-cylinders 39 arranged in the form of a first radial series and, as illustrated in Fig. 2, being three in number. Obviously, a greater or a smaller number of cylinders might be employed. The said cylinders are constituted by bores formed in rotary barrels 24, perpendicularly to the axis of revolution which is parallel with respect to the axis of the driven shaft. Within each pump cylinder a piston 20 is positioned and the rocking of said barrels disengages alternateley the inlet and the outlet port 27—28. The three pistons of the pump are connected at their inner ends to eccentric 19a by means of slipper elements 40.

In the cylindrical and rotary body 2 is also provided a plurality of motor-cylinders 41 arranged in the form of a second radial series. In view of the fact that said arrangement is substantially identical to the first, it is not described. The pistons 21 of the second radial series are supported at their inner ends by a crank-pin 25 by means of slipper elements.

The different pistons are held in contact with the cooperating eccentric 19a and collar 25 through suitable means such as freely revoluble rings 36 engaging shoulders 40 at the inner end of the pistons 20 and 21.

The said collar 25 surrounding the driven shaft 1 is secured to the free end of a crank 7, the crankshaft 42 of which is pivotally carried by a wall of the casing 26, and may act as a fixed bearing for the pistons 21. The collar is with an inner longitudinal comparatively wide passage surrounding the driven shaft (Figs. 3, 4 and 5), the axis of said collar being parallel with respect to the axis of the driven shaft, but it is possible to obtain an angular shifting of the crank 7 through action on it in any suitable manner, so that the axis of the collar 25 will always be parallel with the driven shaft but will have a variable eccentricity that modifies the stroke of the pistons 21. Of course, the eccentricity of the collar 25 may be varied through any suitable means allowing a relative shifting between the axis of the shaft 1 and the crankpin 25.

Since air must be removed from the pump and motor cylinders of the hydraulic unit, a hole is drilled along the axis of the pistons so that the piston head and the slipper elements cooperating with the eccentric 19a and the collar 25 are placed in communication. A distinctive feature of this arrangement is to ensure, besides the blowing of air through a leak, lubrication at the same pressure as that existing above the pistons. Thus friction may be reduced if the bearing surfaces are suitably sized in relation to the bore of the cylinders.

The cylinders of the two radial series of the pump and motor cylinders containing the pistons 20 and 21 form part of a closed hydraulic circuit wherein the cylinders containing the pistons 20 which cooperate with the eccentric 19a have their outlet 27 in permanent connection with the inlet of the cylinders containing the pistons 21 cooperating with the collar 25 and reversely. This arrangement is shown to best advantage in Fig. 6 wherein the outlet ports 27 of the first radial series of cylinders are connected with the inlet ports 28' of the cooperating cylinders through channels connecting them directly and opening in the first annular header 29, while conversely the exhaust ports 27' corresponding to the cylinders containing the pistons 21 are connected with the admission port 28 on the opposite side through bores connecting the different ports with the second annular header 29'. The driven shaft 1 is furthermore bored axially at 4 and revolves inside a stationary ring 3 provided with a bore 3a connected through radial bores in said driven shaft with said axial bore 4 passing through same. Said bore 4 corresponds with the header 29 into which the pistons 20 deliver fluid, through the channel 4a in the pump. On the other hand the driven shaft 1 is provided with a second axial bore 5 independent of the former bore 4 communicating inside the pump with the header 29' into which the pistons 21 deliver the fluid and out of which the pistons 20 suck said fluid, said axial bore corresponding also with the bore 15a in the driving shaft. Said bore or channel 15a forms an auxiliary feed adapted to make up for the leaks in the hydraulic circuit and the bore or channel 3a taps off pressure in order to feed the hydraulic control adjusting the position of the crankpin as described hereinafter.

When it comes to an adaptation for some industrial purpose in a stationary plant, a hand control may be employed. It may consist of a crank 22 working with a worm 23, for instance for obtaining the displacement of the collar 25 as shown diagrammatically in Fig. 4.

But in consequence of the high stresses that act on the collar 25, it is preferable to make use of an automatic hydraulic system in which use is made of the actual pressure of the hydraulic unit.

As illustrated in Fig. 3, a rocker beam 6 is fixed rigidly to the crankshaft 42 of the crank 7 carrying the collar 25. The ends of the beam arms bear on two plungers 8 through semispherical contact steps 9 in order to provide a good surface of contact.

The plungers 8 are movable in cylindrically bored elements 43. The oil coming from the hydraulic unit 2 is fed into one or the other of the plungers through a slider valve or distributor 10 the movements of which are controlled by a finger 11, a small lever 12 controlling same, the axis of which is rigid with the rocker beam 6 and a rod 13 connected on one hand to this small lever 12 and on the other hand to a standard type of centrifugal governor that is illustrated sectionally at 30 in Fig. 8; said governor may control the rod 13 through the intermediary of any suitable linkage including e. g. a lever 31. The channel 34 communicates with the channel 3a while the channel 35 is an outlet discharge.

The same arrangement has been adapted also to the lubrication of the semispherical bearing pieces or steps 9 between the plungers and the rocker beam 6 that controls the crankshaft 42. In addition the contact of each plunger 8 with its step 9 is ensured by a spring 14; this contact is essential since if there were any clearance between said plungers 8 and steps 9; there would be an escape of oil therethrough.

The centrifugal governor is controlled preferably by the driven shaft, but it might just as well be controlled by the driving shaft. The object of the said governor is to cause a variation in the gear ratio of the apparatus when the resistant torque reaches a certain figure that has been determined beforehand. The governor is provided with two governor weights 48 and a spring 44; the weights are rotatably supported by shafts 45 and through the agency of the rod 46 and levers 47 which tend to compress the spring 44 upon outward displacement of the weights 48.

Interposed between the levers 47 and the rocker beam 6 is the rod 13 so that, as the driven shaft speeds up, the centrifugal force developed by the rotation of the weights acts on the rod levers, and rocker beam whereby the eccentricity of the collar 25 is modified. When the speed of the driven shaft 1 increases, the governor weights move away from their inoperative position; consequently the rocker beam moves progressively the collar 25, the eccentricity of which becomes zero when the weights reach their maximum displacement. A direct coupling is thus obtained.

This direct coupling is maintained for speeds of the driven shaft which are greater than the speed corresponding to said maximum displacement of the governor weights 48. The tension of the governor spring 44 may be adjusted once and for all. But, by adjusting the tension of the spring at a greater value, the maximum displacement of the weights is obtained for a greater speed of the driven shaft. The tension of the said spring may even be adjusted automatically by a link with the accelerator control of the apparatus as illustrated in Fig. 8, the said tension being adjusted ad lib. to suit the wishes of the operator when there may be a speed change with the motor revolving at a high rate so as to give more power. The accelerator pedal 51 of the prime mover or internal combustion motor has a mechanical connection with the flexible spring 44 through the link 49 and the lever 50.

If the speed of the driven shaft drops too much, the centrifugal governing device drops nearer to its inoperative position and draws the rod 13 downwards, the result being to move the slider 10 over to the left side (Fig. 3). The oil comes into the left side cylindrically bored element 43 through the bore 34 communicating with the channel 3a and leaves the right hand cylindrically bored element 43 through the bore 35 which is an outlet discharge. The rocker beam 6 is shifted and moves the collar 25 while closing the slider 10. The rocker beam keeps in step always with the movements of the rod 13.

The operation of the actual change speed gear depends on the throw given to the eccentricity of the collar 25 between zero and a maximum corresponding to the actual eccentricity of the eccentric 19a. When the eccentricity of the collar is at a maximum corresponding to said eccentricity of the eccentric 19a, the operative strokes of pistons 20 and 21 are the same; the eccentric 19a remains thus stationary. Consequently the cage 19 is stationary and the ratio between the speeds of the driving and the driven shaft is then equal to the ratio of the gears of the planetary assembly.

It is apparent that, when the output of the motor is modified through this modification in eccentricity of the collar 25 and drops to any desired value including zero, the output of the pump cylinders is controlled to decrease to the same extent; in other words the relative rotary speed between the eccentric 19a and the driven shaft decreases.

While I have described preferred embodiments of my invention, I desire that it be understood that equivalents may be employed and that no limitations upon the invention are intended other than are imposed by the scope of the following claims.

What I claim is:

1. A variable speed transmission including a driving and a driven shaft, a planetary gear assembly therebetween, a cage forming a part of said assembly, an eccentric coupled to said cage, a rotary body coaxial and rigid with the driven shaft including a pump and a motor in the form of two radial series of cylinders, pistons disposed within the pump cylinders operated by said eccentric, pistons disposed within the motor cylinders, a collar carrying said motor pistons and provided with an inner longitudinal wide passage and surrounding the driven shaft, means hydraulically connecting the pump and the motor forming therewith a hydraulic closed circuit, means for carrying the said collar and means for angularly shifting the same to provide variable eccentricity to vary the motor output, whereby the pump necessarily adjusts the speed of the eccentric linked to the cage assembly.

2. A variable speed transmission including a driving and a driven shaft, a planetary gear assembly therebetween, a cage forming a part of said assembly, an eccentric coupled to said cage, a rotary body coaxial and rigid with the driven shaft including a pump and a motor in the form of two radial series of cylinders, pistons disposed within the pump cylinders operated by said eccentric, pistons disposed within the motor cylinders, a collar carrying said motor pistons and provided with an inner longitudinal wide passage and surrounding the driven shaft, each piston adapted to reciprocate in each cylinder comprising at its inner end a slipper element and being axially bored throughout to lubricate the cooperating surfaces of said slipper elements, eccentric and collar at the fluid pressure of the cylinders, means hydraulically connecting the pump and the motor to form therewith a hydraulic closed circuit, means for carrying the said collar and means for angularly shifting the same to provide variable eccentricity.

3. A variable speed transmission including a driving and a driven shaft, a planetary gear assembly therebetween, a cage forming a part of said assembly, an eccentric coupled to said cage, a rotary body coaxially and rigid with the driven shaft including a pump and a motor in the form of two radial series of cylinders, pistons disposed within the pump cylinders operated by said eccentric, pistons disposed within the motor cylinders, a collar carrying said motor pistons and provided with an inner longitudinal wide passage and surrounding the driven shaft, means hydraulically connecting the pump and the motor to form therewith a hydraulic closed circuit, a crank rigid with the collar, a carrier for revolubly supporting said crank to allow the same to revolve round an axis parallel to and spaced from the axis of the driven shaft, means for angularly shifting the said collar to provide variable eccentricity.

4. A variable speed transmission including a driving and a driven shaft, a planetary gear assembly therebetween, a cage forming a part of said assembly, an eccentric coupled to said cage, a rotary body coaxial and rigid with the driven shaft including a pump and a motor in the form of two radial series of cylinders, pistons disposed within the pump cylinders operated by said eccentric, pistons disposed within the motor cylinders, a collar carrying said motor pistons and provided with an inner longitudinal wide passage and surrounding the driven shaft, a hydraulic closed circuit passing through the pump and the motor, means for carrying the said collar, and a crank handle and a worm gear system to shift the collar relatively to said driven shaft to adjust its eccentricity.

5. A variable speed transmission including a driving and a driven shaft, a planetary gear assembly therebetween, a cage forming a part of said assembly, an eccentric coupled to said cage, a rotary body coaxial and rigid with the driven shaft including a pump and a motor in the form of two radial series of cylinders, pistons disposed within the pump cylinders operated by said eccentric, pistons disposed within the motor cylinders, a collar carrying said motor pistons and provided with an inner longitudinal wide passage and surrounding the driven shaft, a closed hydraulic circuit passing through the pump and the motor a crank at the free end of which said collar is rigidly mounted, a stationary carrier for pivotally supporting said crank, a rocker beam rigid with said crank and adapted to rock therewith, an auxiliary automatic system including a distributor and two cylindrically bored elements, means for feeding and removing fluid selectively into and out of either of the bored elements under the control of the distributor, a plunger slidingly carried in each of said bored elements and operatively engaging the ends of the rocker beam, means for controlling the distributor for making either plunger rock the rocker beam and cooperating crank in the corresponding direction.

6. A variable speed transmission including a driving and a driven shaft, a planetary gear assembly therebetween, a cage forming a part of said assembly, an eccentric coupled to said cage, a rotary body coaxial and rigid with the driven shaft including a pump and a motor in the form of two radial series of cylinders, pistons disposed within the pump cylinders operated by said eccentric pistons disposed within the motor cylinders, a collar carrying said motor pistons and provided with an inner longitudinal wide passage and surrounding the driven shaft, means hydraulically connecting the pump and the motor to form therewith a hydraulic closed circuit, means for carrying the said collar, a rocker beam rigid with the collar and adapted to rock therewith, an auxiliary automatic system including a distributor and two cylindrically bored elements, means for feeding and removing fluid selectively into and out of either of the bored elements under the control of the distributor, axially bored plungers slidingly carried in said cylindrically bored elements and operatively engaging the ends of the rocker beam, the lubrication of the cooperating surfaces of the rocker beam and of the plungers being performed through the bores in the plungers by the liquid under pressure in said cylindrical bored elements, means for controlling the distributor for making either plunger rock the rocker beam and crankpin in the corresponding direction.

7. A variable speed transmission including a driving and a driven shaft, a planetary gear assembly therebetween, a cage forming a part of said assembly, an eccentric coupled to said cage, a rotary body coaxial and rigid with the driven shaft including a pump and a motor in the form of two radial series of cylinders, pistons disposed within the pump cylinders operated by said eccentric, pistons disposed within the motor cylinders a collar carrying said motor pistons and provided with an inner longitudinal wide passage and surrounding the driven shaft, means hydraulically connecting the pump and the motor to form therewith a hydraulic closed circuit, means for carrying the said collar, a rocker beam rigid with the collar and adapted to rock therewith, an auxiliary automatic system including a distributor and two cylindrically bored elements, means for feeding and removing fluid selectively into and out of either of the bored elements under the control of the distributor, plungers slidingly carried in said bored elements and operatively engaging the ends of the rocker beam, a centrifugal regulator controlled by the driven shaft, means whereby said regulator controls the distributor for making either plunger rock the rocker beam and collar.

8. A variable speed transmission including a driving and a driven shaft, a planetary gear assembly therebetween, a cage forming a part of said assembly, an eccentric coupled to said cage, a rotary body coaxial and rigid with the driven shaft including a pump and a motor in the form of two radial series of cylinders, pistons disposed within the pump cylinders operated by said eccentric, pistons disposed within the motor cylinders, a collar carrying said motor pistons and provided with an inner longitudinal wide passage and surrounding the driven shaft, means hydraulically connecting the pump and the motor to form therewith a hydraulic closed circuit, a crank at the free end of which said collar is rigidly mounted, means for pivotally carrying said crank, means for automatically angularly shifting the same to provide variable eccentricity of said collar, a centrifugal governor provided with two weights and a spring, an accelerator control system for automatically adjusting the tension of said spring, whereby the action of the governor on the distributor is delayed.

JEAN MARTIN.

REFERENCES CITED

The following references are of record in the file of this patent:

UNITED STATES PATENTS

| Number | Name | Date |
|---|---|---|
| 2,219,052 | Orshansky | Oct. 22, 1940 |
| 2,276,908 | Schmid | Mar. 17, 1942 |
| 2,296,929 | Ifield | Sept. 29, 1942 |

FOREIGN PATENTS

| Number | Country | Date |
|---|---|---|
| 603,395 | France | Jan. 8, 1926 |